United States Patent Office 3,302,106
Patented Jan. 31, 1967

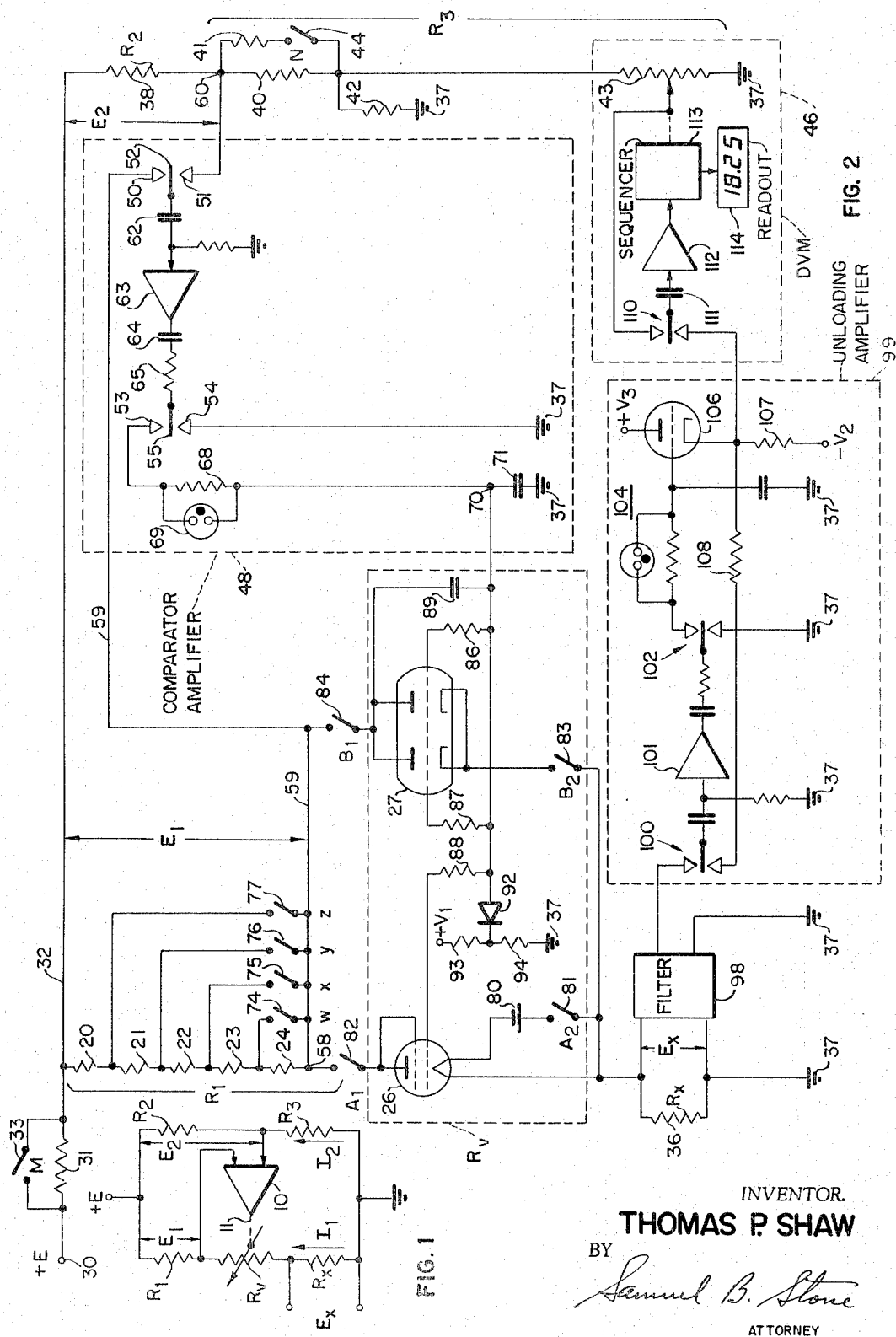

---

3,302,106
RESISTANCE MEASURING APPARATUS INCLUDING AN AUTOMATIC BALANCING BRIDGE
Thomas P. Shaw, Berkeley, Calif., assignor to Beckman Instruments, Inc., a corporation of California
Filed May 29, 1963, Ser. No. 284,041
6 Claims. (Cl. 324—62)

This invention relates to a converter and more particularly to a device for converting resistance to potential difference and its utilization with a means for measuring potential difference.

Various devices are utilized for measuring resistance. A typical arrangement employs a Wheatstone bridge in which an unknown resistance is connected in one leg of the bridge, a variable resistance is connected in a second leg of the bridge, and fixed resistances are connected in the remaining two legs of the bridge. A constant voltage is applied to two of the terminals of the bridge, and the voltages at the remaining two terminals of the bridge are compared and the variable resistance varied until these two latter voltages are equal. When these two voltages are equal, the resistance of the variable resistance is proportional to the unknown resistance. An example of such a device is illustrated in U.S. Patent No. 2,482,196. As illustrated in this patent, a comparator amplifier is utilized to measure the voltage difference across the bridge and to operate some type of mechanism to vary the variable resistance until the two voltages are equal. The accuracy of such a device depends upon the accuracy of the variable resistance and its calibration.

In many instances it is desirable to employ a device for measuring resistance which may be utilized with a voltage measuring device such as a conventional digital voltmeter so that the digital voltmeter may measure a voltage and provide a visual, or other type, output indicative of resistance. A digital voltmeter may be used in the conventional bridge-type arrangement by measuring the voltage across either the unknown resistance or the variable resistance and internally dividing this measured voltage by a constant proportional to the current through the resistance across which the voltage is measured in order to get an accurate measurement of the actual unknown resistance. Since the current through the unknown resistance or variable resistance changes depending upon the magnitude of the unknown resistance, a different constant or current measurement is required for each resistance measurement. Additionally, a comparator amplifier which has linear characteristics throughout a wide range of input impedances and currents is required since the impedances and currents in the bridge vary and the comparator amplifier in the bridge sees a variable input impedance depending on the value of the unknown resistance. Furthermore, both the bridge and digital voltmeter utilize fixed reference voltage sources. If either or both of these sources vary with time or with temperature, inaccuracies will result in the resistance measurement.

Accordingly, the present invention provides a resistance to potential difference conversion device which may be used in combination with a digital voltmeter or ratiometer to overcome the above deficiences.

An additional feature of the present invention is the provision of a resistance to potential difference conversion device operating as a self-balancing constant current source which may be used in combination with a digital voltmeter or ratiometer wherein a voltage ratio measurement is made, and wherein a single reference source is used for both the device and the digital voltmeter.

A further feature of the present invention is the provision of a highly accurate resistance to potential difference conversion circuit which operates as a self-balancing constant current source, and which may be used with a voltage ratio measuring device in order to accurately measure an unknown resistance.

According to an illustrative example of the present invention, a pair of current paths is provided, one of which includes a fixed resistance, a variable resistance comprised of one of a plurality of vacuum tubes and an unknown resistance all connected in series across a fixed voltage source, and the other of which includes a pair of fixed resistances connected in series across the same fixed voltage source. A voltage appearing across the fixed resistance in the first current path and produced by a first current is compared to a reference voltage appearing across a first fixed resistance in the second current path. The comparator amplifier functions to adjust the variable resistance in the first current path to balance these two voltages. When the value of the unknown resistance is changed in the first current path, a change in current occurs resulting in a difference in the two voltages. The comparator amplifier detects this difference and changes the value of the variable resistance to rebalance these two voltages. The variable resistance, therefore, functions to maintain a constant current in the first current path. The voltage across the unknown resistance is thus proportional to its resistance.

The potentiometer of a digital voltmeter or ratiometer is connected as part of the second fixed resistance in the second current path, and the voltage across the unknown resistance which is proportional to its resistance is applied to the input of the digital voltmeter or ratiometer. As will be seen subsequently, the digital voltmeter makes a voltage ratio measurement and since a constant current is maintained by the converter, this voltage ratio measurement results in an output proportional to the resistance of the unknown resistance.

Other features and objects of the invention will be better understood from a consideration of the following detailed description when read in conjunction with the attached drawings in which:

FIG. 1 shows a self-balancing constant current network; and

FIG. 2 illustrates a resistance to potential difference converter constructed in accordance with the teachings of the present invention.

Reference may first be made to FIG. 1 for an understanding of the basic concepts and operation of a self-balancing constant current source. Resistances $R_1$, $R_v$ and $R_x$ are connected in series across a positive voltage source E and ground. Resistances $R_2$ and $R_3$ are also connected across the source E and ground. The resistances $R_1$, $R_2$ and $R_3$ are fixed in value. The resistance $R_v$ is a variable resistance, and the resistance $R_x$ is an unknown resistance which is to be measured. Two inputs of a comparator amplifier 10 are connected respectively between the resistances $R_1$ and $R_v$, and between the resistances $R_2$ and $R_3$. The comparator amplifier 10 serves to detect any differences in the voltages $E_1$ and $E_2$ appearing across the respective resistances $R_1$ and $R_2$, and to vary the resistance $R_v$, as indicated diagrammatically by the dashed line 11, to make the voltage $E_1$ equal the voltage $E_2$.

The positive voltage E is a fixed stable voltage. The resistances $R_2$ and $R_3$ are selected to provide a predetermined voltage drop across the resistance $R_2$. For example, assume that voltage E is $+25$ volts, and the resistances $R_2$ and $R_3$ are 10 kilo-ohms and 15 kilo-ohms, respectively. Since the voltage E is constant, the voltage $E_2$ across the resistance $R_2$ is 10 volts.

The voltage $E_2$, which may be termed a reference voltage, is produced by a constant current $I_2$. The voltage $E_2$ is compared to the voltage $E_1$ which is produced by a current $I_1$. A balanced condition exists when the voltages $E_1$ and $E_2$ are equal. When the value of the unknown resistance $R_x$ is changed in the current path $I_1$, the resulting change in current $I_1$ causes a change in the voltage $E_1$. The comparator amplifier 10 senses the difference between the voltages $E_1$ and $E_2$ and changes the value of the resistance $R_v$ to adjust the voltage $E_1$ to again equal the voltage $E_2$. A voltage $E_x$ which is developed across the resistance $R_x$ as a result of the constant current $I_1$ is the voltage which is measured to determine the value of $R_x$.

The comparator amplifier draws no current in the null condition. As noted above, it compares the voltage $E_1$ and the voltage $E_2$, and if they are different the resistance $R_v$ is changed in the proper direction to increase or decrease the current $I_1$ until the voltages $E_1$ and $E_2$ are equal. Since, in the above example, the voltage drop $E_2$ across the resistance $R_2$ is fixed at 10 volts, the voltage $E_1$ also is 10 volts in the null condition. If the resistance $R_x$ is zero, the voltage across the resistance $R_v$ is 15 volts at null. If the resistance $R_x$ is at full scale (equal to the resistance $R_1$), the voltage across the resistance $R_x$ is 10 volts and the voltage across the resistance $R_v$ is 5 volts. If the resistance $R_x$ is at a mid-scale value (mid-scale with respect to the resistance $R_1$), the voltage $E_x$ is 5 volts and the voltage across the resistance $R_v$ is 10 volts. Thus, the current $I_1$ changes momentarily when the resistance $R_x$ is changed, but returns to its fixed value at null.

For any resistance range, the resistance $R_1$ is selected to equal the full-scale value of the resistance $R_x$. For example, if resistances $R_x$ are to be measured in the range of .1 ohm to 10 kilo-ohms, the resistance $R_1$ is chosen to be 10 kilo-ohms. The voltage $E_x$ is equal to $I_1$ times $R_x$, and $E_x$ may be measured with a suitable voltage measuring instrument. One advantage of this circuit resides in the fact that the resistance $R_x$ is grounded, and therefore, may be in a circuit that is grounded and still be accurately measured. As will appear subsequently in a discussion of an exemplary embodiment of the present invention, since $I_1$ is constant at null a voltage ratio measurement may be made which indicates the ohmic value of the resistance $R_x$.

By utilizing a rebalancing constant current arrangement, a more linear rebalancing system results because the comparator amplifier is always working with a substantially constant input impedance. This is true for any given range of the converter because the resistance $R_v$ is always varied such that the resistances $R_1$, $R_v$ and $R_x$ are a constant value in order to provide the constant current. Such is not the case with a Wheatstone bridge arrangement wherein the unknown resistance is placed in one leg and the variable resistance is placed in another leg of the bridge.

Probably the most critical element of the circuit shown in FIG. 1 is the resistance $R_v$. This resistance must be controlled by the comparator amplifier, but the control current must be a negligible percentage of the current $I_1$, for example, less than .01% of the current $I_1$ for an instrument of .01% resolution and linearity. For the large values of $R_1$ and $R_x$, the problem becomes even more critical. In this case, if the resistances $R_1$ and $R_x$ (full scale) are 10 megohms each and the voltage $E_x$ is 10 volts, then the current $I_1$ is equal to 1 microampere. The control current for $R_v$ must be less than .01% of 1 microampere, or $10^{-10}$ ampere. According to a feature of the present invention, an electrometer tube is used as the variable resistance $R_v$ for high range measurements.

Conversely, typical electrometer tubes cannot carry the larger currents required for low resistance ranges. The 10 kilo-ohms and 1 kilo-ohm ranges generally require currents of 1 milliamp and 10 milliamps, respectively. According to an additional feature of the present invention, an ordinary single or dual vacuum tube, photoresistor, photo-transistor or field effect transistor may be employed for the low resistance measurements where the control current may be much larger.

FIG. 2 illustrates an exemplary embodiment of a resistance to potential difference converter constructed in accordance with the teachings of the present invention. The impedance or resistance $R_1$ is a range-selecting resistance and includes resistances 20 through 24 which, for example, may be 1 kilo-ohm, 9 kilo-oms, 90 kilo-ohm, .9 megohm, and 9 megohms, respectively. The resistance $R_v$ includes an electrometer tube 26 and a dual triode 27. The electrometer tube 26 may be a type 5886 and the dual triode 27 may be a type 7308, for example. One of these tubes may be selectively switched into the circuit during certain ranges of resistance measurements. For example, the electrometer tube 26 may function as the resistance $R_v$ when measuring in the 100 kilo-ohms, 1 megohm and 10 megohm ranges; whereas, the dual triode 27 may be switched into the circuit for the 1 kilo-ohm and 10 kilo-ohm ranges.

A regulated positive voltage source E is connected to a terminal 30. The terminal 30 is connected through a resistance 31 to a positive voltage bus 32. A switch 33 (also designated M) is connected across the resistance 31. The resistances 20 through 24 comprising the resistance $R_1$, the resistance $R_v$ (which may be the tube 26 or the tube 27) and the resistance $R_x$, denoted by the reference numeral 36, are connected in series between the positive voltage bus 32 and a ground terminal 37.

The resistances $R_2$ and $R_3$ which are shown on the right-hand side of FIG. 2 are connected in series between the positive voltage bus 32 and the ground terminal 37. The resistance $R_2$ is denoted by the reference numeral 38, and the resistance $R_3$ is comprised of a combination of resistances 40 through 43. The resistance 41 may be connected in shunt with the resistance 40 by means of a switch 44. The switch 33 across the resistance 31 is operated to change the voltage on the voltage bus 32 depending upon which of the tubes 26 or 27 is being employed. Additionally, the switch 44 is opened or closed depending upon what voltage is applied to the bus 32 in order to maintain a fixed voltage drop across the resistance 38 ($R_2$) no matter which tube 26 or 27 is being employed. The resistance 43 may be the potential divider, such as a Kelvin-Varley potentiometer or a Wolff-Poggendorf divider in a digital voltmeter 46 as shown in FIG. 2, and this arrangement will be discussed in greater detail subsequently. The resistance 42 is connected in parallel with the resistance 43 in order to provide, in combination with the resistances 40 and 41, the proper value for the resistance $R_3$.

A comparator amplifier 48 (equivalent to the comparator amplifier 10 shown in FIG. 1) is connected to compare the voltage drops across the resistances $R_1$ and $R_2$ and to control the impedance of one of the tubes 26 or 27 constituting the resistance $R_v$. The comparator amplifier 48 is a conventional A.C. coupled chopper amplifier and includes an input chopper having fixed contacts 50 and 51, and a movable contact arm or reed 52. A similar chopper including fixed contacts 53 and 54, and a movable contact arm 55 is connected in the output circuit of the amplifier. The fixed contact 50 is connected to a terminal 58 by a line 59, the terminal 58 being connected between the resistance $R_1$ and the resistance $R_v$. The fixed contact 51 is connected to a terminal 60 which is connected between the resistances $R_2$ and $R_3$. The movable arm 52 of the chopper is coupled through a coupling capacitor 62 to an amplifier 63. The output of the amplifier 63 is coupled through a coupling capacitor 64 and resistance 65 to the movable arm 55 of the output chopper. The fixed contact 54 is connected to ground 37, and the fixed contact 53 is connected through the parallel combination of a resistance 68 and a neon tube 69 to an output terminal 70. The output terminal 70 is connected to ground 37 through a capacitor 71.

The chopper arms 52 and 55 are operated in synchronism by a suitable electromagnetic winding (not shown). The arm 52 serves to alternately sample the voltages $E_1$ and $E_2$. Assume that in the initial condition the chopper arms or reeds 52 and 55 respectively contact fixed contacts 51 and 54. The arm 52 is then connected to the reference voltage $E_2$. The capacitor 62 charges to the voltage $E_2$. The arm 55 is in contact with ground, thus charging the capacitor 64 to the voltage at the output of the amplifier 63. When the chopper arms swing to the opposite position, i.e., arms 52 and 55 are connected with contacts 50 and 53, respectively, the arm 52 receives the voltage $E_1$. If the unknown resistance $R_x$ is changed, the voltage $E_1$ will not be equal to the voltage $E_2$, and the charge on the capacitor 62 will change to the value of the voltage $E_1$. When the charge on the capacitor 62 changes, a voltage change will be developed at the input to the first stage of the amplifier 63. This change is amplified through the amplifier 63 (which, for example, may include three stages) and be applied to the arm 55. Since the arm 55 now is in contact with the contact 53, the capacitor 71 is charged toward a new voltage through the resistance 68 and the neon tube 69. The final charge on the capacitor 71 is the voltage that is applied to control the variable resistance $R_v$ as will be discussed subsequently.

As noted previously, the resistance $R_1$ includes the resistances 20 through 24. Switches 74 through 77 are provided to shunt selected combinations of the resistances 21 through 24. The switch 74 is connected across the resistance 24, and the switch 75 is connected across the combination of resistances 23 and 24. The resistance 76 is connected across the resistances 22 through 24, and the switch 77 is connected across the resistances 21 through 24. Assuming the resistances 20 through 24 have the values stated previously, then the switch 77 is closed to select the 1 kilo-ohm range, the switch 76 is closed to select the 10 kilo-ohm range, the switch 75 is closed to select the 100 kilo-ohm range, and the switch 74 is closed to select the 1 megohm range. All switches 74 through 77 are open for the 10 megohm range. As noted previously, tubes 26 and 27 are utilized as the variable resistance $R_v$. The tube 26 has a directly heated cathode which is connected to the unknown resistance 36. A battery 80 and a switch 81 are connected to the directly heated cathode of the tube 26 to apply current thereto. When the switch 81 is closed, the tube 26 is turned on. The plate of the tube 26 is connected through a switch 82, designated $A_1$, to the terminal 58.

The cathodes of the double triode 27 are connected together and through a switch 83, designated $B_2$, to the unknown resistance 36. The plates of the tube 27 are connected together, and connected through a switch 84, designated $B_1$, and the line 59 to the terminal 58. The output terminal 70 of the comparator amplifier 48 is connected through resistances 86 and 87 to the grids of the tube 27, and through a resistance 88 to the grid of the tube 26. A capacitor 89 is connected between the terminal 70 and the plates of the tube 27. The terminal 70 also is connected to a limiter network including a diode 92 and a voltage divider having a pair of resistances 93 and 94 connected between a voltage source $+V_1$ and ground 37.

The switches 81 through 84 ($A_2$, $A_1$, $B_2$ and $B_1$) are operated to switch either one of the tubes 26 or 27 into the circuit as the variable resistance $R_v$. The tube 26 is switched into the circuit by closing the switches 81 and 82 for high range measurements, for example, 100 kilo-ohms, 1 megohm and 10 megohms. The tube 27 is switched into the circuit by closing the switches 83 and 84 for low range measurements, for example, 1 kilo-ohm and 10 kilo-ohms. The following table illustrates which switches are closed for the different ranges of operation.

| Ranges | Switches (X=Closed) | | | | | | | | | |
|---|---|---|---|---|---|---|---|---|---|---|
| | $A_1$ | $A_2$ | $B_1$ | $B_2$ | W | X | Y | Z | M | N |
| 1 K | — | — | X | X | — | — | — | X | X | — |
| 10 K | — | — | X | X | — | — | X | — | X | — |
| 100 K | X | X | — | — | — | X | — | — | — | X |
| 1 M | X | X | — | — | X | — | — | — | — | X |
| 10 M | X | X | — | — | — | — | — | — | — | X |

The switch M (33) is closed to apply a higher plate voltage to the tube 27. The switch N (44) is closed when a lower voltage (because of the dropping resistance 31) is applied to the bus 32. Switch N shunts the resistance 40 with a lower resistance 41 to maintain the voltage $E_2$ substantially the same (such as 10 volts) irrespective of which voltage is applied to the bus 32.

The tube 26 or 27 which is switched into the circuit is controlled by the voltage appearing at the output terminal 70 of the comparator amplifier 48. Any change in the voltage applied to the grid of either one of the tubes 26 or 27 affects its conductance, and thus is resistance. The resistance 68 and the capacitor 71 in the comparator amplifier 48 function as a filter with a long time constant. The neon tube 69 aids in bringing the tube 26 or 27 to its proper conduction value more rapidly. The charge on the capacitor 64 in the comparator amplifier is added to a subsequent new voltage in the output stage of the amplifier 63 to provide an increased voltage which aids in the firing of the neon tube 69. When the neon tube 69 fires, the time constant of the network including the capacitor 71, the resistance 68 and the neon tube 69 is reduced and the capacitor 71 charges rapidly. As the capacitor 71 charges and the tube 26 or 27 brings the voltage $E_1$ closer to the voltage $E_2$, the voltage existing across the neon tube 69 is reduced until this tube is extinguished. The long time constant of the resistance 68 and capacitor 71 then comes into effect and the final control of the tube 26 or 27 is brought about slowly. Additionally, the filter network including the resistance 68 and the capacitor 71 converts the square wave voltages resulting from the operation of the input and output choppers of the amplifier 48 to produce a smooth D.C. level at the grid of the tube 26 or 27.

The comparator amplifier 48 is A.C. coupled to reduce operating voltage drift as a result of circuit and temperature changes. Except for the condition (one point in each range) where the grid voltage of the tube 26 or the tube 27 is required to be zero with respect to ground, the capacitor 71 must carry a charge (plus or minus) at null. In order to maintain the charge, a small error signal exists at the capacitor 62. Therefore, the comparator amplifier 48 must have sufficient gain so that this potential difference between the voltages $E_1$ and $E_2$ is a fraction of the instrument's minimum reading (resolution) for example less than one millivolt. If the charge on the capacitor 71 leaks off slightly the error signal will increase slightly in amplitude.

The diode 92, and resistances 93 and 94 which may be termed a limiter network protect the grids of the tubes 26 and 27 from exceeding a predetermined voltage (such as +15 volts). The diode 92 is back-biased to this predetermined voltage through the divider network including the resistances 93 and 94. If the unknown resistance $R_x$ is removed from the circuit, the comparator amplifier 48 tends to drive the grid of the tube 26 or 27 toward a high positive voltage. This voltage will not exceed the predetermined voltage because of the inclusion of the limiter network and hence the grids of these tubes will not be damaged. When the unknown resistance $R_x$ is inserted in the circuit, the voltage at the grid of the tube 26 or 27 will return to its normal value as the charge on the capacitor 71 bleeds off.

The resistances 86 through 88 connected to the grids of the tubes 26 and 27 prevent excessive grid currents. The capacitor 89 connected with plates of the tube 27 reduces the gain of the loop including the tube 27 and the amplifier 48 to prevent oscillations.

After the comparator amplifier 48 has reached a null ($E_1$ equal to $E_2$), the voltage across the unknown resistance 36 may be measured. The voltage across the resistor 36 is coupled through a filter network 98 and an unloading amplifier 99 to the digital voltmeter 46. The unloading amplifier 99 ensures that only negligible current is drawn by the digital voltmeter 46. The unloading amplifier 99 (unity closed-loop gain) includes an input chopper 100, a high gain amplifier 101, an output chopper 102 and a resistance-capacitance-neon tube circuit 104 constructed and operated in substantially the same manner as the corresponding components in the comparator amplifier 48. The network 104 is coupled to the grid of a cathode follower including a triode 106 and a resistance 107. Feedback is provided through a resistance 108 to the input chopper 100.

The output of the unloading amplifier 99 is taken from the cathode of the tube 106 and connected to an input chopper 110 of a comparator amplifier in the digital voltmeter 46. The comparator amplifier in the digital voltmeter 46 includes the input chopper 110 which is connected through a capacitance 111 to an amplifier 112. The output of the amplifier 112 is employed to operate a sequencing device 113 which in turn operates the potential divider 43 and a digital readout device 114. The digital voltmeter 46 functions to convert the analog voltage output of the unloading amplifier 19 to a digital value which may be read on the readout device 114. As noted previously, the potential divider 43 of the digital voltmeter 46 may comprise part of the $R_2$–$R_3$ voltage divider. The resistance to voltage converter shown in FIG. 2 and the digital voltmeter 46 each requires a reference voltage source. If separate voltage sources are employed for these two components, errors may occur because of drift in the reference sources. This problem is eliminated by employing the digital voltmeter as a ratiometer and using the reference voltage E as the reference voltage for the digital voltmeter 46 also. Thus, if the reference voltage E does drift, it makes no difference to the pair of instruments (resistance to voltage converter and the digital voltmeter).

One or none of the switches 74 through 77 may be closed to select the operating range of the converter. The digital voltmeter 46 makes a voltage ratio measurement and since constant currents are involved in the converter, this voltage ratio measurement is directly proportional to the value of the unknown resistance 36 in ohms. The ratio of the resistance of 36 to the sum of the resistances $R_x$ and $R_v$ (or $R_x$, $R_v$ and $R_1$) is the same as the ratio of the voltage $E_x$ to the voltage from terminal 58 to ground 37 (or bus 32 to ground 37, respectively). Taking an example, assume that a positive voltage of 70 volts is applied to the bus 32 (by closing the switch M) and the converter is switched to its 10 kilo-ohm range. The switches $B_1$, $B_2$ and Y are closed. The resistance $R_1$ is equal to 10 kilo-ohms (1 kilo-ohm + 9 kilo-ohms). The tube 27 functions as the resistance $R_v$. The potentiometer 43 typically has a value of 50 kilo-ohms, and the resistance 42 is selected to have a value such that the parallel combination of resistances 42 and 43 is equal to 10 kilo-ohms. The resistance 40 has a value of approximately 50 kilo-ohms, and the resistance $R_2$ has a value of 10 kilo-ohms. The resistances $R_2$, 40 and 42 are chosen such that their combination with the resistance 43 provides a voltage drop across the resistance $R_2$ of 10 volts (resistance 40 is shunted by the resistance 41 when a lower voltage is applied to the bus 32 to maintain the voltage $E_2$ at 10 volts). Thus, the voltage between the terminal 60 and ground 37 is 60 volts when the voltage between the bus 32 and ground 37 is 70 volts. Likewise, it will be seen that when the comparator amplifier 48 has reached a null, the voltage between the terminal 58 and ground 37 is 60 volts since the voltage drop across the resistance $R_1$ is 10 volts which is equal to the voltage drop across the resistance $R_2$.

A digital voltmeter effectively compares its input voltage to a fixed reference voltage appearing across its potential divider 43. The digital voltmeter sequencer 113 varies the tap on the potentiometer 43 until the voltage at this tap is equal to the input voltage to the digital voltmeter. The voltage indicated by the DVM is a percentage of the voltage across its potential divider and a percentage of the voltage between terminal 60 (or bus 32) and ground. In the arrangement shown in FIG. 1 the voltage $E_x$ across the unknown resistance $R_x$ effectively is compared with the reference voltage of the DVM to provide a measure of the voltage $E_x$. When a null occurs, the readout device 114 indicates the voltage $E_x$. Since the current through the resistance $R_x$ is constant, the voltage $E_x$ bears the same relationship to the voltage between the terminal 58 or 60 and ground (60 volts), as the resistance $R_x$ bears to the total resistance $R_x + R_v$. Therefore, the voltage $E_x$ is directly proportional to the magnitude of the resistance $R_x$ for any set range.

Although only certain specific resistance measuring ranges have been illustrated and described for the present converter, these ranges may be extended by including other range resistances such as the resistances 20 through 24 which comprise the resistance $R_1$. The upper range is limited practically by the accuracy of the resistances obtainable and by the input impedance of the comparator amplifier 48. In order to further reduce the lower range (such as 0 to 100 ohms) it may be more desirable to increase the gain of the unloading amplifier by increasing the gain of the amplifier 99 than to change the resistance $R_1$ to 100 ohms. For example, if a 100 ohm range is desired the 1 kilo-range may be used by increasing the gain of the amplifier 99 from unity to a gain of 10. In this way, neither the resistance $R_x$ nor the tube 27 would have to carry a higher current which would be required for this lower range.

It will be understood that although an exemplary embodiment of the present invention has been disclosed and discussed, other applications and circuit arrangements are possible and that the embodiment disclosed may be subjected to various changes, modifications, and substitutions without necessarily departing from the spirit of the invention.

What is claimed is:

1. In combination, a resistance to voltage converter and a digital voltmeter, said digital voltmeter including a first resistance which is employed as a potential divider, the improvement comprising second and third fixed resistances, vacuum tube means which is controllable to provide a variable impedance, an unknown resistance to be measured, a comparator amplifier, a first current path including said second resistance, said tube means, and said unknown resistance connected in series with a voltage source, a second current path including said third resistance and said first resistance of said digital voltmeter connected across said voltage source, means connecting said comparator amplifier with said first and second current paths to compare the voltage drops across said second and third resistances and to vary the impedance of said tube means until said voltage drops are equal to thereby maintain a constant current in said first current path, and means connecting the terminals of said unknown resistance as an input to said digital voltmeter whereby said digital voltmeter measures the voltage across said unknown resistance to provide an indication of the value of the resistance thereof.

2. A combination as in claim 1 wherein, said second resistance includes a plurality of resistors connected in series and a plurality of switches connected in shunt with different groups of said resistors, each group including at least one of said resistors for selectively shunting said resistors to change the ohmic value of said second resistance for selecting the range of operation of said converter, said tube means includes a plurality of vacuum tubes, and means for connecting a selected one of said vacuum tubes in series with said second resistance and said unknown resistance for different ranges of operation of said converter.

3. A combination as in claim 2 wherein said first resistance of said digital voltmeter is a Kelvin-Varley potential divider.

4. In combination, a resistance to voltage converter and a ratiometer, said ratiometer including a first resistance which is employed as a potential divider, the improvement comprising second and third fixed resistances, a vacuum tube which is controllable to provide a variable impedance, an unknown resistance to be measured, a comparator amplifier, a first current path including said second resistance, said tube, and said unknown resistance connected in series with a voltage source, a second current path including said third resistance and said first resistance of said ratiometer connected across said voltage source, means connecting said comparator amplifier with said first and second current paths to compare the voltage drops across said second and third resistances and to vary the impedance of said tube until said voltage drops are equal to thereby maintain a constant current in said first current path, and means connecting the terminals of said unknown resistance as an input to said ratiometer whereby said ratiometer measures the voltage across said unknown resistance to provide an indication of the value of the resistance thereof.

5. An impedance to potential difference converter for converting the ohmic value of an unknown resistance to a voltage directly proportional to the ohmic value thereof comprising a first current path including a first resistance, a variable resistance and said unknown resistance connected in series with a voltage source, a second current path including a second resistance and a third resistance connected in series with said voltage source, said first resistance including a plurality of resistors connected in series, switch means coupled with said resistors for shunting selected ones of said resistors to select the range of operation of said converter, said variable resistance including first and second tubes and first and second switch means coupled with the respective first and second tubes for rendering one or the other of said tubes operative in said converter circuit, comparator means having inputs connected respectively between said first resistance and said variable resistance, and between said second and third resistances for comparing the voltages appearing at its input and providing an output signal to control the tube of said variable resistance which is operatively connected in the converter circuit, whereby said comparator means causes said operative tube to vary in resistance until the voltages at the input of said comparator means are equal, and measuring means coupled with said unknown resistance for measuring the resistance value thereof as a function of the ratio of the voltage across the unknown resistance to the voltage across said third resistance.

6. A converter as in claim 5 wherein said pair of tubes comprising said variable resistance include an electrometer tube and a dual triode tube and, said measuring means includes a digital voltmeter having its input connected across said unknown resistance and having its input connected across said unknown resistance and having a potential divider therein which includes at least a portion of said third resistance.

References Cited by the Examiner
UNITED STATES PATENTS 2,848,684   8/1958   Tuppin _____ 324—57
3,181,061   4/1965   Schneider _____ 324—62

WALTER L. CARLSON, *Primary Examiner.*

W. H. BUCKLER, E. E. KUBASIEWICZ,
*Assistant Examiners.*